United States Patent

[11] 3,600,016

| [72] | Inventor | Donald R. Dilley<br>Seattle, Wash. |
|---|---|---|
| [21] | Appl. No. | 21,642 |
| [22] | Filed | Mar. 23, 1970 |
| [45] | Patented | Aug. 17, 1971 |
| [73] | Assignee | The Boeing Company<br>Seattle, Wash. |

[54] FRAME STRINGER TIE
9 Claims, 8 Drawing Figs.

[52] U.S. Cl. .................................................. 287/189.35,
248/300, 114/88, 244/119, 287/51
[51] Int. Cl. .................................................. F16b 1/00
[50] Field of Search ......................................... 287/189.36
R, 189.36 C, 189.36 A, 49, 51, 54 B, 189.35, 248,
660; 248/300; 244/119; 114/88

[56] References Cited
UNITED STATES PATENTS

| 1,332,325 | 3/1920 | Crowe .......................... | 114/88 |
| 1,774,593 | 9/1930 | Day et al. ...................... | 287/189.36 R X |
| 2,485,090 | 10/1949 | Finch ........................... | 287/189.35 |
| 2,491,086 | 12/1949 | Busch .......................... | 287/189.36 R X |
| 2,554,176 | 5/1951 | Edwards ....................... | 248/300 X |
| 2,737,268 | 3/1956 | Smith .......................... | 287/189.36 R |
| 2,982,521 | 5/1961 | Berish ......................... | 287/189.36 R X |

*Primary Examiner*—David J. Williamowsky
*Assistant Examiner*—Wayne L. Shedd
*Attorneys*—Glenn Orlob and Bernard A. Donahue ABSTRACT: An aircraft axial force tie member for load transfer between first and second major structural elements; for example, between fuselage frame and skin stringer members acted upon by internal pressurization loadings. The tie member is economically constructed of lightweight flat sheet stock to provide a balanced load path having a high resistance to structural fatigue by virtue of a member shaping concept characterized by the use of a flat pattern having bend or mold lines which are curved, in contradistinction to the straight mold lines of conventional ties. The curved mold lines as disclosed will cause a wiping action during forming to thereby generate member flanges which extend in a balanced fashion on either side of the centerline of the axial force carried by the member. Embodiments suitable for forming from titanium sheet are shown for use with zee-section and with hat-section stringers.

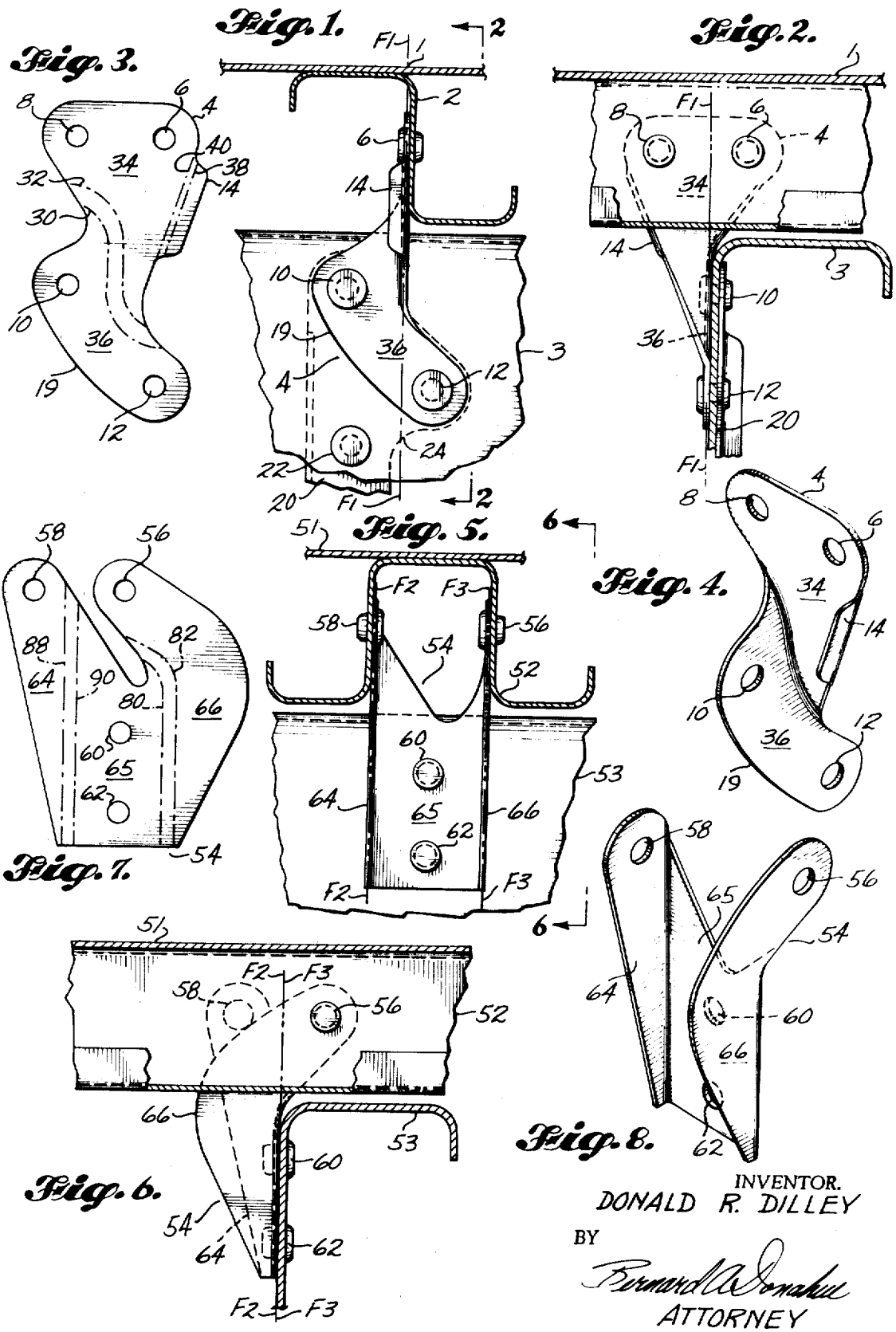

FRAME STRINGER TIE

This invention relates to an aircraft structural load transfer member, and more particularly, to a fuselage frame-to-stringer tie member which inherently has a balanced load path and which can be economically formed from flat sheet stock.

The primary purpose of a frame-to-stringer tie is to transfer fuselage pressure induced loads from the skin stringer to the frame.

Conventional fuselage designs for modern aircraft often involve an outer pressurized skin, longitudinally aligned stringer members attached to the inside surface of the skin, and circumferentially aligned closed frame members for ultimately reacting cabin pressure forces. The tie member of this invention is designed to provide a balanced load path between the longitudinally aligned stringer web and the radially aligned frame web at each crossover point. This load transfer is accomplished for the purpose of dumping pressure loads into the frame for a balanced hoop tension reaction.

In a large supersonic aircraft the required quantity of frame-to-stringer tie members may exceed 15,000. The obvious safety critical aspects of these primary structural members dictate the need for the most efficient design possible. For optimum design such a tie member should be lightweight, economical to manufacture, and highly resistant to structural fatigue. As a structural element, the tie member would be categorized as a two-force member. In the usual case the tie member serves primarily to transfer tension loadings with little, if any, compression capacity required. Some amount of stiffness may be desirable in the plane of the tie which is normal to the tension load path, to resist differential movement of frame and stringer.

Prior art frame-stringer tie members have usually involved angle, channel, or machined T-section fittings, riveted directly to the radially and longitudinally directed web segments of the frame and stringer. Due to the criticality of the load path, such prior art members have normally been relatively heavy extruded sections with appropriate machining for fit and weight reduction. Problems associated with many such prior art designs include cost, relative inefficiency from a weight standpoint, eccentric or unbalanced load paths which induce undesirable bending stresses within the part, and a relatively unsatisfactory fatigue life for pressure induced cycling loads.

Accordingly, it is an object of this invention to provide an aircraft structural frame-to-stringer tie member which inherently has a balanced load path.

A related object of this invention is to provide a lightweight frame stringer tie member which is highly resistant to structural fatigue and can be economically formed from flat sheet stock.

A related object of this invention is to provide an economical method of forming a titanium structural tie member from flat sheet stock such that it has a high strength-to-weight ratio and a relatively long fatigue lifetime.

The above objectives have been achieved in the disclosed design by a unique shaping concept for forming a member from flat sheet stock having a balanced load path from stringer to frame. The shaping concept is characterized by the use of a flat pattern having bend or mold lines which are curved, in contradistinction to the straight mold lines used for forming flanges of conventional ties, in a manner appropriate to obtaining a wiping action during forming to thereby generate flanges which extend in a balanced fashion on each side of the centerline of action of the axial force which is being carried by the member. The resulting tie member will efficiently transfer axial load between first and second major structural elements; e.g., between fuselage frame and skin stringer members acted upon by internal pressure.

The invention will be better understood by reference to the drawings, in which:

FIG. 1 is a fragmented cross-sectional view of a frame-to-stringer joint incorporating applicant's tie member for use with a zee-section stringer.

FIG. 2 is a cross-sectional view taken along lines 2—2 in FIG. 1.

FIG. 3 is a flat pattern for forming the tie member shown in FIG. 1.

FIG. 4 is an isolated isometric view illustrating the tie member formed from FIG. 3 flat pattern.

FIG. 5 is a view similar to FIG. 1 showing applicant's tie member configuration when used with a hat-section stringer.

FIG. 6 is a cross-sectional view taken at 6—6 in FIG. 5.

FIG. 7 is a flat pattern for forming the tie member of FIG. 5.

FIG. 8 is an isolated isometric view illustrating the tie member formed from the FIG. 7 flat pattern.

FIG. 1 may be considered to be a cross-sectional view through a stringer located on the top dead center of an aircraft fuselage, with the viewer looking forward. The pressurized fuselage skin 1 can be seen to be attached to a zee-section stringer 2 which comprises an outer flange, a longitudinally aligned straight and flat web, and an inner flange. An adjacent circumferentially aligned pressure frame 3 similarly comprises an outer flange, a circumferentially aligned straight and flat web, and an inner flange (not shown). The frame 3 will normally be a continuous member having an overall shape which approximates a circle, thereby being adapted to carry and react fuselage pressure loads (delivered by the stringers) in hoop tension.

Applicant's load transferring tie member is shown at 4 in FIG. 1 and also in the sectional view of FIG. 2. The reference force axis labeled $F_1$ can be defined as located along a line formed by the intersection of a plane which lies along the surface of the web portion of the stringer with a plane which lies along the surface of the web portion of the frame. The force line $F_1$ can be seen to fall well within the tie member 4 in either view. The force axis $F_1$ is the ideal and most direct load transfer path between the frame and stringer members. The reason for this is that the stringer pressure load to be transferred is primarily carried by outwardly directed shear forces within the longitudinally extending web portion of the stringer 2. Also, and similarly, the load transfer into the frame 3 will be accomplished at least initially and locally, be resisting shear forces within the radially aligned web of the frame. Therefore, the ideal tie member should consist of a very thin but stiff member fully affixed along the depth of each web and having a balanced centerline corresponding to the force axis $F_1$. An approach directed toward this ideal construction would tend to minimize eccentricities and unbalance in the load path, thereby reducing induced stress levels and increasing fatigue life.

The embodiment of FIGS. 1 and 2 provides a force balanced tie member affixed on each side of force axis $F_1$ to stringer 2 by means of balancing rivets 6 and 8. The attachment of tie member 4 to frame 3 is likewise accomplished by a pair of balancing rivets 10 and 12, one on each side of force line $F_1$. A stiffening flange 14 may optionally be provided on the longest unsupported side of the tie member 4 if compression loadings are anticipated. The edge 19 will normally define the inner limit of tie member 4. For most installations the tie member can be attached to the web of frame 3 without a requirement for a backup angle stiffener such as shown at 20 on the opposite side of the web. However, where conventional angle-type stiffeners are provided in the near vicinity for other reasons, such as web stiffening, a backup design will give improved capability for a negligible weight increase. If desired, the tie member may be made integral with the frame stiffener member. An integral part (tie member and stiffener bent up from same sheet stock) on one side of the frame (not shown) would serve to simplify assembly by elimination of one part where a stiffener is also required. When the tie member and frame stiffener combination 20 is used as shown, the angle stiffener is conventionally connected to the frame web by a line of rivets aligned under river 22, and the stiffener is increased in section as at 24 to encompass the balancing rivets 10 and 12. The stiffener, in other respects, is a conventional angle type web stiffener with an upstanding flange.

The FIG. 3 flat pattern clearly displays the unusual curved bend or mold lines characterizing applicant's unique tie member. As will be understood by persons skilled in this art, the generally S-shaped lines 30 and 32, having straight portions bounded by curved portions, are "beginning of bend" lines which define the points at which curvature begins. It is noted that recent practice in the aircraft industry has been to define flat pattern bends in terms of outside mold lines rather than beginning of bend lines. However, beginning of bend lines will be used here in view of widespread use of this terminology outside of the aircraft industry, and to more clearly define the invention. As a practical matter, the two line systems are parallel, and are in many cases in identical locations.

The tie member 4 is bent during forming to provide an outer or stringer flat flange 34, and an inner or frame flat flange 36. The flat flanges 34 and 36 as shown are formed substantially orthogonally displaced, i.e., at 90° with respect to each other, for attachment to similarly displaced webs of the frame-stringer joint.

The area between bend lines 30 and 32 may be defined as a central bend area having predetermined values of bend radii dictated by manufacturing technique and design practice. As indicated by the drawings, all curvature occurs within this central bend area which serves to interconnect the two flat flanges 33 and 36. Note that the central bend area shown in the FIG. 3 flat pattern displays three distinct portions: a first portion having uniform width and straight boundaries (centrally located and vertically aligned as shown), and second and third portions having curved boundaries which extend to the outer edges of the member.

Applicant's unique flat pattern will create a part such as tie member 4 having unusual flanges characterized by being wiped or wrapped over during forming to extend each of the flat flanges 34 and 36 in a balanced fashion on each side of one of the reference web planes which define the ideal force axis. Structural fasteners placed in the flanges on each side of the web planes will assure an axial load path virtually free of eccentric loading.

The optional stiffening flange 14 can be seen to utilize conventionally straight bend lines 38 and 40. Because of a proposed initial utilization in a supersonic aircraft, frame ties constructed to date have been made of titanium sheet stock; either Ti8-1-1 or Ti6A14V ranging from approximately 0.025 to 0.040 inches in thickness ($t$). The tie members can be readily cold formed in titanium, using bend radii of the order of $3t$. Adjustment and nonuniform variation of bend radii along the bend may be desirable if unsatisfactory parts are obtained. Adiprene pads have been employed in the manner of female dies to facilitate economical forming on conventional brake form machines. Stress relief by means of heat may be required for some configurations.

FIG. 4 illustrates the tie member 4 in an isolated isometric view after forming and prior to installation in the aircraft. This isometric showing brings out the unusual three-dimensional shape of the tie member.

FIG. 5 is a cross section view similar to FIG. 1 showing a tie member configuration for use in installations having hat-section stringers. The pressurized fuselage skin 51 is attached to hat-section stringer 52 which comprises an outer flange, a pair of longitudinally aligned web portions, and a pair of inner flanges. A pressure frame 53 is located adjacent the stringer 52. The tie member 54 can be seen to be interconnecting the frame-stringer joint in FIG. 5 and also in the FIG. 6 cross section taken at 6–6 in FIG. 5. The two reference force axes labeled $F_2$ and $F_3$ can be defined as located along the two lines formed by the intersections of the three web surface planes involved here in a manner similar to the definition given in connection with the FIG. 1 embodiment. Because each of the pair of stringer web portions of FIG. 5 share the load to be transferred, a balance of forces with respect to both the reference force lines is appropriate in this case.

Applicant's tie member 54 embodiment shown in FIG. 6 provides a force balanced tie member 54 which is affixed, on each side of the web surface plane passing through both force axes, to the stringer 52 by means of balancing rivets 56 and 58. The attachment of tie member 54 to frame 53 is likewise accomplished by a balanced load path through rivets 60 and 62, centrally located between force lined $F_2$ and $F_3$ (FIG. 5). Tie member 54 can be seen to comprise a conventionally bent flat flange 64, a central flat flange 65, and a curved bend line flat flange 66 which extends on each side of the web surface plane passing through both force axes.

FIG. 7, a flat pattern showing which is similar to FIG. 3, again displays the unusual curved bend lines which characterize applicant's tie member concept. The beginning of bend lines 80 and 82 are similar to the FIG. 3 bend lines 30 and 32 in that each comprises a straight segment and a curved segment, with the curvature arranged such that the bend line demonstrates a substantial change in slope (in excess of 45°) before reaching the edge of the part. The bend lines 88 and 90 are conventionally straight for forming the flange 64 which locates the rivet 58 to the left of the plane of force lines $F_2$ and $F_3$ as viewed in FIG. 6. However, the curved mold lines 80 and 82 create an unusual curved or "wrapped over" flange 66 which places the rivet 56 to the right of the plane of force lines in FIG. 6, thereby causing a balanced force distribution for unloading stringer 52 into frame 53.

FIG. 8 is an isolated isometric view similar to FIG. 4 which displays the tie member 54 as formed from the flat pattern on FIG. 7, prior to installation in the frame-stringer joint. It should be noted that flanges similar to the flange 14 of FIG. 4 can be added to the unsupported edges of the tie member 54 if desired for stiffening or stability reasons.

The two basic tie member configurations presented have been found to account for substantial weight and cost reductions considering equivalent static and fatigue life strength of conventional tie members. In either configuration the balanced load paths will allow localized chem milling to effect further weight reduction. Also a substantial misalignment of frames and stringers can be tolerated without inducing unduly high stress levels within the tie or related parts. Excellent sonic fatigue life can be anticipated because of the load path balance.

Typical frame and stringer gages used with the tie members have been of the order of 0.040 inches for the stringer and 0.050 inches for the frame. Where thinner sections are used, it may be desirable to increase the number of rivets involved and change the size and shape of the tie member flat flanges accordingly. Specimens of both types constructed according to the teachings of this disclosure have been fatigue tested to over 9,000,000 cycles with a 500 pound tension load without failure.

What I claim is:

1. A tie member for transferring axial load along a reference axis between two major structural elements which are substantially angularly displaced with respect to each other wherein each of said elements has at least one primary load carrying web that is flat and straight, and said reference axis is located along a line established by the intersection of a plane which lies along a surface of said web of one of said elements with a plane which lies along a surface of said web of the other of said elements, the tie member comprising:
   a flat flange disposed and arranged for attachment to the web of one of said structural elements,
   a flat flange disposed and arranged for attachment to the web of the other of said structural elements,
   a central bend area having predetermined values of bend radii, and serving to interconnect said flat flanges, characterized by a first portion having substantially uniform width and straight boundaries defined by the beginning of bend curvature, and a second portion having curved boundaries which interconnect each of said flat flanges,
   wherein one of said flat flanges extends on each side of one of the planes locating said reference axis.

2. The member of claim 1 wherein said second portion extends to an outer edge of said tie member.

3. The member of claim 1 wherein said member is connected to one of said structural elements by means of structural fasteners on each side of one of the planes locating said reference axis.

4. The member of claim 3 wherein said member is also connected to the other of said structural elements by means of structural fasteners positioned on each side of the other of the planes locating said reference axis.

5. The member of claim 3 wherein one of said flat flanges is integrally connected to a third flat flange extending substantially normal to said one of said flat flanges.

6. The member of claim 3 wherein the other of said flat flanges extends on each side of the other of the planes locating said reference axis, and is affixed to one of said webs by a structural fastener located on each side of said other plane.

7. The member of claim 6 wherein said one of said flat flanges is affixed to the other of said webs by one structural fastener on each side of said one of the planes locating said reference axis.

8. The member of claim 5 wherein one of said major structural elements includes a second primary load carrying web and said third flange is affixed thereto by means of a structural fastener.

9. The member of claim 8 in which said member has a generally U-shaped or channel cross section wherein the other of said flat flanges and said third flange each are disposed in a direction substantially normal to said one of said flat flanges.